United States Patent
Feigenbaum et al.

(10) Patent No.: US 12,530,541 B2
(45) Date of Patent: Jan. 20, 2026

(54) SYSTEMS AND METHODS FOR EDITING A LARGE LANGUAGE MODEL

(71) Applicant: Salesforce, Inc., San Francisco, CA (US)

(72) Inventors: Itai Izhak Feigenbaum, San Francisco, CA (US); Devansh Arpit, Pacifica, CA (US); Shelby Heinecke, San Francisco, CA (US); Juan Carlos Niebles Duque, Mountain View, CA (US); Weiran Yao, San Francisco, CA (US); Huan Wang, Palo Alto, CA (US); Caiming Xiong, Menlo Park, CA (US); Silvio Savarese, Palo Alto, CA (US)

(73) Assignee: Salesforce, Inc., San Francisco, CA (US)

( * ) Notice: Subject to any disclaimer, the term of this patent is extended or adjusted under 35 U.S.C. 154(b) by 246 days.

(21) Appl. No.: 18/428,530

(22) Filed: Jan. 31, 2024

(65) Prior Publication Data
US 2025/0124233 A1    Apr. 17, 2025

Related U.S. Application Data

(60) Provisional application No. 63/590,323, filed on Oct. 13, 2023.

(51) Int. Cl.
*G06F 40/40* (2020.01)
*G06N 7/01* (2023.01)

(52) U.S. Cl.
CPC ............... *G06F 40/40* (2020.01); *G06N 7/01* (2023.01)

(58) Field of Classification Search
None
See application file for complete search history.

(56) References Cited

U.S. PATENT DOCUMENTS

| | | | |
|---|---|---|---|
| 2024/0104309 A1* | 3/2024 | Hsu | G06N 3/0455 |
| 2024/0411981 A1* | 12/2024 | Braddy | G06F 8/30 |
| 2025/0190506 A1* | 6/2025 | Park | G06F 40/56 |

OTHER PUBLICATIONS

Feigenbaum, Itai, et al. "Editing arbitrary propositions in llms without subject labels." arXiv preprint arXiv:2401.07526 (2024). (Year: 2024).*
Dai, Damai, et al. "Knowledge neurons in pretrained transformers." arXiv preprint arXiv:2104.08696 (2021). (Year: 2021).*

(Continued)

*Primary Examiner* — Douglas Godbold
(74) *Attorney, Agent, or Firm* — Haynes and Boone, LLP (57) ABSTRACT

Systems and methods for editing a large language model are provided. The large language model generates a sequence of tokens, a first probability of a pre-edit output based on the sequence of tokens, and a second probability of a target output based on the sequence of tokens. A loss function is provided based on the first probability and the second probability. A plurality of gradients of the large language model with respect to the loss function is computed. An edit location of the large language model is determined based on the plurality of gradients. The large language model is edited by editing weights at the edit location of the large language model, such that the updated large language model generates the target output for an input including the sequence of words.

20 Claims, 8 Drawing Sheets

(56) References Cited

OTHER PUBLICATIONS

Yao, Yunzhi, et al. "Editing large language models: Problems, methods, and opportunities." arXiv preprint arXiv:2305.13172 (2023). (Year: 2023).*

Kevin Meng, David Bau, Alex Andonian, and Yonatan Belinkov. 2022a. Locating and editing factual associations in gpt. Advances in Neural Information Processing Systems, 35:17359-17372.

* cited by examiner

Table 702:

|  | original | rephrases | neighbor. |
|---|---|---|---|
| mean | 97 | 96 | 97 |
| CI upper | 98.98 | 98.43 | 98.98 |
| CI lower | 91.55 | 90.16 | 91.55 |

Table 704:

|  | CFF | CFT | FACT |
|---|---|---|---|
| accuracy | 76.39 | 79.56 | 92.22 |

Table 706:

| location | CFF | +last | CFT | +last |
|---|---|---|---|---|
| pre subject | .89 | .58 | .52 | .36 |
| subject in | 19.09 | 17.36 | 18.97 | 17.92 |
| subject last | 72.72 | 69.52 | 72.7 | 70.5 |
| post subject | 7.3 | 4.38 | 7.8 | 6.03 |
| last | 0 | 8.18 | 0 | 5.19 |
| subject total | 91.81 | 86.88 | 91.67 | 88.42 |

Table 708:

|  | pre | $ROME^G$ | $ROME^S$ |
|---|---|---|---|
| CFF | | | |
| effic. | 26.47 | 99.76 | 99.75 |
| gen. | 20.39 | 95.74 | 99.3 |
| spec. | 77.24 | 73.05 | 75.66 |
| total | 33.85 | 87.82 | 90.05 |
| CFT | | | |
| effic. | 17.33 | 99.9 | 99.71 |
| gen. | 17.6 | 95.95 | 99.22 |
| spec. | 78.68 | 74.29 | 76.58 |
| total | 23.58 | 88.51 | 90.46 |
| FACT | | | |
| effic. | 11.43 | 100 | |
| gen. | 14.94 | 86.38 | |
| spec. | 96.12 | 71.82 | |
| total | 18.2 | 84.51 | |

*FIG. 7*

| CFF | sub. in | sub. last | non sub. |
|---|---|---|---|
| % cases | 19.09 | 72.72 | 8.19 |
| effic. | 99.92 | 99.97 | 97.40 |
| gen. | 99.63 | 99.88 | 49.9 |
| spec. | 80.12 | 73.44 | 53.14 |
| total | 92.23 | 89.2 | 61.08 |
| CFT | | | |
| % cases | 18.97 | 72.7 | 8.33 |
| effic. | 99.92 | 99.99 | 99.05 |
| gen. | 99.9 | 99.88 | 82.65 |
| spec. | 73.55 | 77.94 | 44.11 |
| total | 89.25 | 91.34 | 57.96 |

SYSTEMS AND METHODS FOR EDITING A LARGE LANGUAGE MODEL

CROSS REFERENCE(S)

The instant application is a nonprovisional of and claims priority under 35 U.S.C. 119 to U.S. provisional application No. 63/590,323, filed Oct. 13, 2023, which is hereby expressly incorporated by reference herein in their entirety.

TECHNICAL FIELD

The embodiments relate generally to machine learning systems for natural language processing, and more specifically to editing large language models.

BACKGROUND

Machine learning systems have been widely used in question answering and fact checking. For example, large language models have been used to respond to queries, e.g., "What is the capital New York?" Relatedly language models have been used to fact check, i.e., evaluate if a statement is true or false. For example, in response to the input prompt "True or False: There has never been a female Italian Prime Minister.\nAnswer:," a large language model trained before the year 2022 if works as intended, correctly outputs "True." After 2022, the same large language model would now incorrectly output "True." In other words, the knowledge embedded in large language models may become out of date, requiring editing. Some past attempts at editing large language models have required labelled data in a particular format.

Therefore, there is a need for improved systems and methods for editing large language models.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Large language model (LLM, also referred to as model) contains a wealth of factual information. A proposition is a Boolean statement, meaning it has a truth (true or false) value. Factual information/knowledge pertains to the truth values of propositions. The factual information in the LLM can be modified by editing methods. For example, the proposition "There has never been a female Italian Prime Minister" was true prior to October 2022, and false since October 2022. Therefore, a model trained on data prior to 2022 should "consider" this proposition true. Given a Boolean classification prompt "True or false: There has never been a female Italian Prime Minister.\nAnswer:" the pre-2022 trained LLM should reply with "True" or a semantically equivalent answer.

LLM editing methods aspire to change the LLM's factual information, without necessarily training the LLM with new data (e.g., without training the pre-2022 trained LLM with post-2022 data). In the above example, the purpose of editing is to make the LLM model consider the proposition "There has never been a female Italian Prime Minister" false (regardless of the exact phrasing), while keeping its other factual knowledge intact. After a successful edit, the post-edit LLM model should classify the statement above and its rephrases such as "Italy never had a female Prime Minister" as "False." The classification of related (neighborhood) statements like "In the United Kingdom, the head of government is the Prime Minister" should remain unchanged. The success of an edit may be measured with various measures, including: efficacy-the edit's success in changing the response to the original prompt; generalization-the edit's success in changing the model's response to different phrasings of the original prompt, without editing directly for those phrasings; and specificity-the edit's success in not modifying the model's response to prompts that should not be influenced by the edit (in other words, preventing "collateral damage").

One approach for editing LLM is Locate-and-Edit (L&E), which assumes that factual information in LLMs is localized to a certain region of the neural network. After locating this hypothesized region, L&E methods modify the weights in this hypothesized region to achieve the desired effect. Other L&E methods apply only to binary propositions, which capture straightforward binary relations between a subject and an object. For example, the proposition "France is located in Europe" is binary with the subject, relation, and object being France, location, and Europe respectively, while the proposition "Chris Evans portrayed Captain America in the MCU" is not binary. Note that while it is technically possible to cast the proposition "Chris Evans portrayed Captain America in the MCU" as a binary relation, it would not be a straightforward one. For example, defining Chris Evans as the subject, the MCU as the object, and "portrayed Captain America in" as the relation would render the relation in question complex and highly specific. Furthermore, other L&E methods rely on subject labels, which may not be available. For example, to edit "France is located in Europe," other L&E methods require the subject "France" to be labeled.

In view of the need for an improved language model editing framework, embodiments described herein provide a language model editing framework, which provides systems and methods for editing arbitrary propositions without subject labels. First, the large language model editing framework uses a fast and simple knowledge locating method called Gradient Tracing (GT), which attributes factual knowledge to the location that maximizes the gradient norm of the multilayer perceptron (MLP) component in some subset of the underlying transformer neural network of the LLM. Second, at the gradient norm maximizing location, an editing method (e.g., Rank-One Model Editing (ROME) or other suitable editing method) is applied to edit at the token chosen by GT.

For comparison, experiments are performed using another method (referred to as ROME$^S$), where subject labels are used to apply ROME at the last subject token, based on the hypothesis that the last subject token would be a good location for editing, a hypothesis following an experiment with a locating method called Causal Tracing. Causal Tracing itself requires knowledge regarding the location of the subject, and thus also cannot be applied without subject labels.

Figure 1:
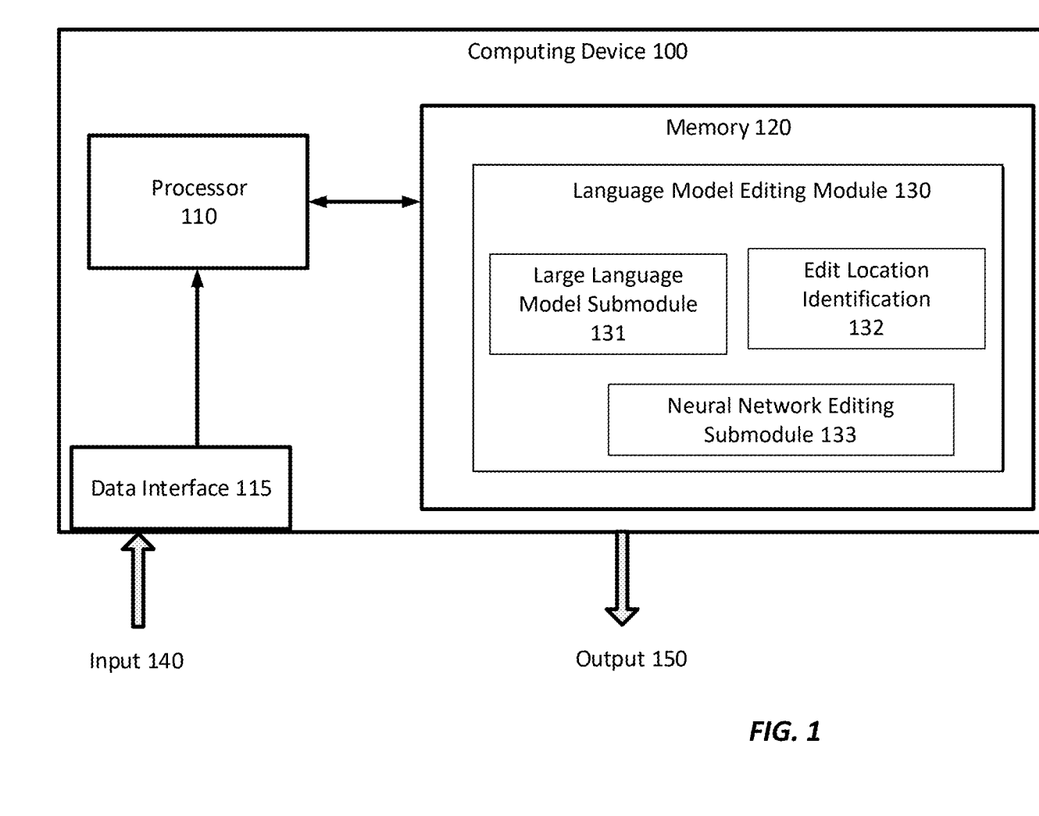
FIG. 1 is a simplified diagram illustrating a computing device implementing the language model editing framework described throughout the specification, according to one embodiment described herein.

FIG. 1 is a simplified diagram illustrating a computing device implementing the language model editing framework described throughout the specification, according to one embodiment described herein. As shown in FIG. 1, computing device 100 includes a processor 110 coupled to memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some examples, memory 120 may include non-transitory, tangible, machine readable media that includes executable code that when run by one or more processors (e.g., processor 110) may cause the one or more processors to perform the methods described in further detail herein. For example, as shown, memory 120 includes instructions for language model editing module 130 that may be used to implement and/or emulate the systems and models, and/or to implement any of the methods described further herein. A language model editing module 130 may receive input 140 via the data interface 115 and generate an output 150.

The data interface 115 may comprise a communication interface, a user interface (such as a voice input interface, a graphical user interface, and/or the like). For example, the computing device 100 may receive the input 140 (such as a training dataset) from a networked database via a communication interface. Or the computing device 100 may receive the input 140 from a user via the user interface.

In some embodiments, the language model editing module 130 is configured to perform a classification task. The language model editing module 130 may further include a pretrained language model submodule 131, an edit location identification submodule 132, a neural network editing submodule 133, which are all further described below. In one embodiment, the language model editing module 130 and its submodules 131-133 may be implemented by hardware, software and/or a combination thereof.

In one embodiment, the language model editing module 130 and one or more of its submodules 131-133 may be implemented via an artificial neural network. The neural network comprises a computing system that is built on a collection of connected units or nodes, referred to as neurons. Each neuron receives an input signal and then generates an output by a non-linear transformation of the input signal. Neurons are often connected by edges, and an adjustable weight is often associated to the edge. The neurons are often aggregated into layers such that different layers may perform different transformations on the respective input and output transformed input data onto the next layer. Therefore, the neural network may be stored at memory 120 as a structure of layers of neurons, and parameters describing the non-linear transformation at each neuron and the weights associated with edges connecting the neurons. An example neural network may be PointNet++, PointBERT, PointMLP, and/or the like.

Some examples of computing devices, such as computing device 100 may include non-transitory, tangible, machine readable media that include executable code that when run by one or more processors (e.g., processor 110) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 2:
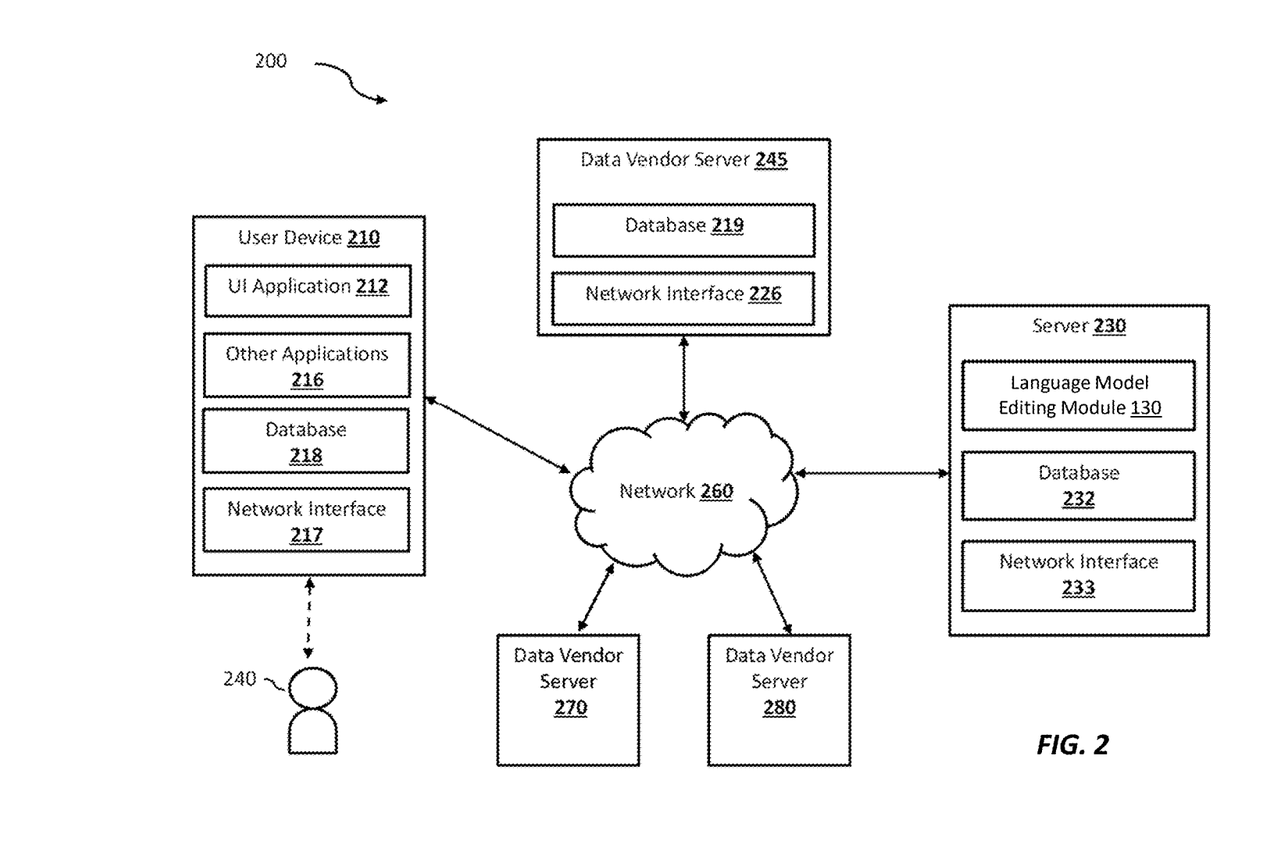
FIG. 2 is a simplified diagram of a networked system suitable for implementing the language model editing framework, according to some embodiments.

FIG. 2 is a simplified block diagram of a networked system suitable for implementing the language model editing framework in embodiments described herein. In one embodiment, block diagram 200 shows a system including the user device 210 which may be operated by user 240, data vendor servers 245, 270 and 280, server 230, and other forms of devices, servers, and/or software components that operate to perform various methodologies in accordance with the described embodiments. Exemplary devices and servers may include device, stand-alone, and enterprise-class servers which may be similar to the computing device 100 described in FIG. 1, operating an OS such as a MICROSOFT® OS, a UNIX® OS, a LINUX® OS, or other suitable device and/or server-based OS. It can be appreciated that the devices and/or servers illustrated in FIG. 2 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 210, data vendor servers 245, 270 and 280, and the server 230 may communicate with each other over a network 260. User device 210 may be utilized by a user 240 (e.g., a driver, a system admin, etc.) to access the various features available for user device 210, which may include processes and/or applications associated with the server 230 to receive an output data anomaly report.

User device 210, data vendor server 245, and the server 230 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

User device 210 may be implemented as a communication device that may utilize appropriate hardware and software configured for wired and/or wireless communication with data vendor server 245 and/or the server 230. For example, in one embodiment, user device 210 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 210 of FIG. 2 contains a user interface (UI) application 212, and/or other applications 216, which may correspond to executable processes, procedures, and/or applications with associated hardware. For example, the user device 210 may receive a message from the server 230 and display the message via the UI application 212. In other embodiments, user device 210 may include additional or different modules having specialized hardware and/or software as required.

In various embodiments, user device 210 includes other applications 216 as may be desired in particular embodiments to provide features to user device 210. For example, other applications 216 may include security applications for implementing client-side security features, programmatic client applications for interfacing with appropriate application programming interfaces (APIs) over network 260, or other types of applications. Other applications 216 may also include communication applications, such as email, texting, voice, social networking, and IM applications that allow a user to send and receive emails, calls, texts, and other notifications through network 260. For example, the other application 216 may be an email or instant messaging application that receives a prediction result message from the server 230. Other applications 216 may include device interfaces and other display modules that may receive input and/or output information. For example, other applications 216 may contain software programs for asset management, executable by a processor, including a graphical user interface (GUI) configured to provide an interface to the user 240 to view the prediction/classification result.

User device 210 may further include database 218 stored in a transitory and/or non-transitory memory of user device 210, which may store various applications and data and be utilized during execution of various modules of user device 210. Database 218 may store user profile relating to the user 240, predictions previously viewed or saved by the user 240, historical data received from the server 230, and/or the like. In some embodiments, database 218 may be local to user device 210. However, in other embodiments, database 218 may be external to user device 210 and accessible by user device 210, including cloud storage systems and/or databases that are accessible over network 260.

User device 210 includes at least one network interface component 219 adapted to communicate with data vendor server 245 and/or the server 230. In various embodiments, network interface component 219 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 245 may correspond to a server that hosts one or more of the databases 203a-n (or collectively referred to as 203) to provide training datasets including training images and questions to the server 230. The database 203 may be implemented by one or more relational database, distributed databases, cloud databases, and/or the like.

The data vendor server 245 includes at least one network interface component 226 adapted to communicate with user device 210 and/or the server 230. In various embodiments, network interface component 226 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 245 may send asset information from the database 203, via the network interface 226, to the server 230.

The server 230 may be housed with the language model editing module 130 and its submodules described in FIG. 1. In some implementations, module 130 may receive data from database 219 at the data vendor server 245 via the network 260 to generate a classification for a classification task. The generated classification may also be sent to the user device 210 for review by the user 240 via the network 260.

The database 232 may be stored in a transitory and/or non-transitory memory of the server 230. In one implementation, the database 232 may store data obtained from the data vendor server 245. In one implementation, the database 232 may store parameters of the language model editing model 130. In one implementation, the database 232 may store previously generated classifications, and the corresponding input feature vectors.

In some embodiments, database 232 may be local to the server 230. However, in other embodiments, database 232 may be external to the server 230 and accessible by the server 230, including cloud storage systems and/or databases that are accessible over network 260.

The server 230 includes at least one network interface component 233 adapted to communicate with user device 210 and/or data vendor servers 245, 270 or 280 over network 260. In various embodiments, network interface component 233 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 260 may be implemented as a single network or a combination of multiple networks. For example, in various embodiments, network 260 may include the Internet or one or more intranets, landline networks, wireless networks, and/or other appropriate types of networks. Thus, network 260 may correspond to small scale communication networks, such as a private or local area network, or a larger scale network, such as a wide area network or the Internet, accessible by the various components of system 200.

Figure 3:
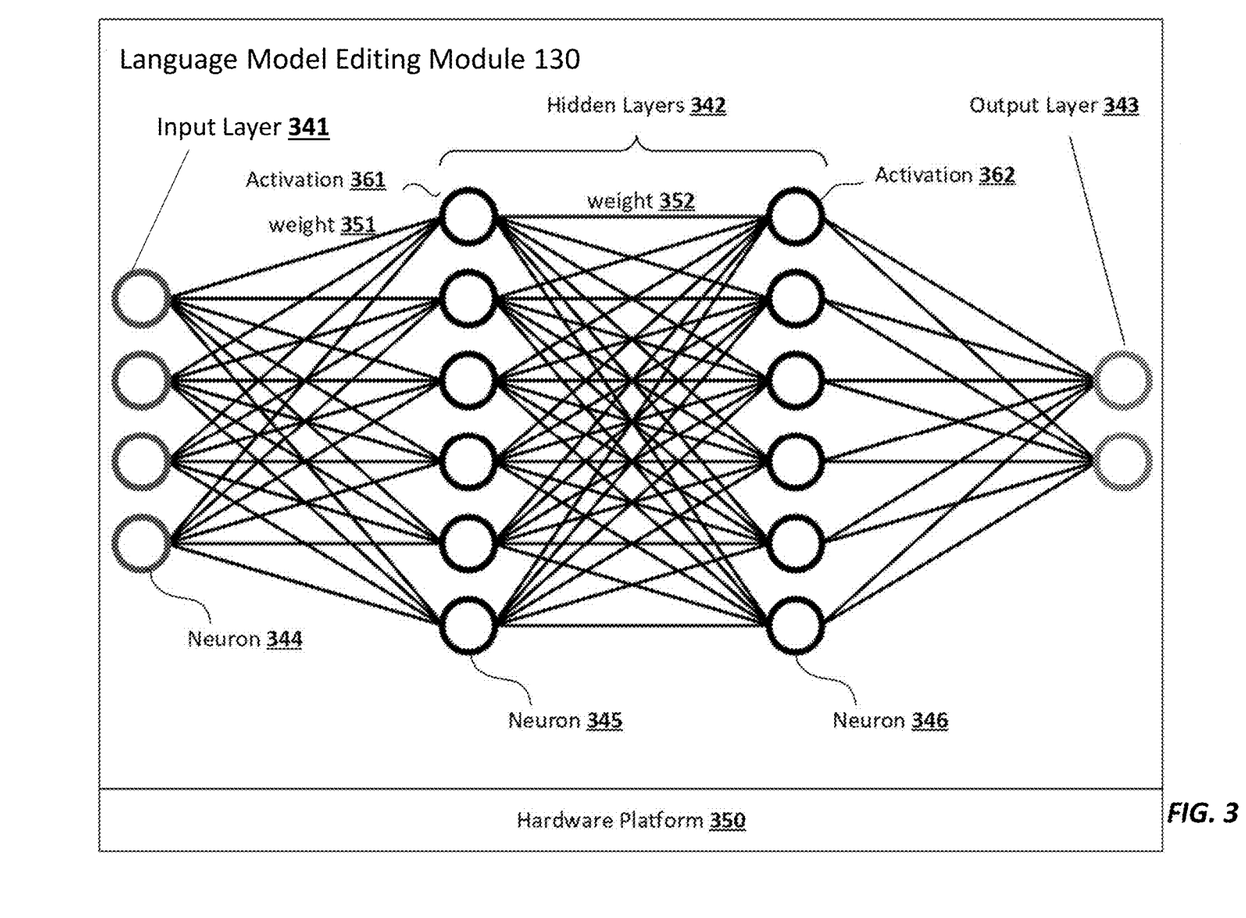
FIG. 3 is a simplified diagram illustrating an example neural network structure implementing one or more neural network models of the language model editing module 130 described in FIG. 1, according to some embodiments.

FIG. 3 is a simplified diagram illustrating an example neural network structure implementing one or more neural network models of the language model editing module 130 described in FIG. 1, according to some embodiments. In one embodiment, the language model editing module 130 and/or one or more of its submodules 131-133 may be implemented via an artificial neural network structure shown in FIG. 3. The neural network comprises a computing system that is built on a collection of connected units or nodes, referred to as neurons (e.g., 344, 345, 346). Neurons are often connected by edges, and an adjustable weight (e.g., 351, 352) is often associated with the edge. The neurons are often aggregated into layers such that different layers may perform different transformations on the respective input and output transformed input data onto the next layer.

For example, the neural network architecture may comprise an input layer 341, one or more hidden layers 342 and an output layer 343. Each layer may comprise a plurality of neurons, and neurons between layers are interconnected according to a specific topology of the neural network topology. The input layer receives the input data (e.g., an input question). The number of nodes (neurons) in the input layer 341 may be determined by the dimensionality of the input data (e.g., the length of a vector of the input question). Each node in the input layer represents a feature or attribute of the input.

The hidden layers 342 are intermediate layers between the input and output layers of a neural network. It is noted that two hidden layers 342 are shown in FIG. 3 for illustrative purpose only, and any number of hidden layers may be utilized in a neural network structure. Hidden layers 342 may extract and transform the input data through a series of weighted computations and activation functions.

For example, as discussed in FIG. 1, the language model editing module 130 receives an input 140 of a question, and its semantic parsing submodule generates an output of a representation corresponding to the input question. To perform the transformation, each neuron receives input signals, performs a weighted sum of the inputs according to weights assigned to each connection (e.g., 351, 352), and then applies an activation function (e.g., 361, 362, etc.) associated with the respective neuron to the result. The output of the activation function is passed to the next layer of neurons or serves as the final output of the network. The activation function may be the same or different across different layers.

Example activation functions include but not limited to Sigmoid, hyperbolic tangent, Rectified Linear Unit (ReLU), Leaky ReLU, Softmax, and/or the like. In this way, after a number of hidden layers, input data received at the input layer 341 is transformed into rather different values indicative data characteristics corresponding to a task that the neural network structure has been designed to perform.

The output layer 343 is the final layer of the neural network structure. It produces the network's output or prediction based on the computations performed in the preceding layers (e.g., 341, 342). The number of nodes in the output layer depends on the nature of the task being addressed.

Therefore, the language model editing module 130 and/or one or more of its submodules 131-133 may comprise the transformative neural network structure of layers of neurons, and weights and activation functions describing the non-linear transformation at each neuron. Such a neural network structure is often implemented on one or more hardware processors 110, such as a graphics processing unit (GPU). An example neural network may be a T5 model, a generative encoder-decoder model (e.g., FiD), and/or the like.

In one embodiment, the language model editing module 130 and its submodules 131 and 132 may be implemented by hardware, software and/or a combination thereof. For example, the language model editing module 130 and its submodules 131 may comprise a specific neural network structure implemented and run on various hardware platforms 350, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The hardware platform 350 used to implement the neural network structure is specifically configured depends on factors such as the complexity of the neural network, the scale of the tasks (e.g., training time, input data scale, size of training dataset, etc.), and the desired performance.

In one embodiment, the neural network based language model editing module 130 and one or more of its submodules 131-133 may be trained by iteratively updating the underlying parameters (e.g., weights 351, 352, etc., bias parameters and/or coefficients in the activation functions 361, 362 associated with neurons) of the neural network based on the loss. For example, during forward propagation, the training data such as input questions and paragraphs are fed into the neural network. The data flows through the network's layers 341, 342, with each layer performing computations based on its weights, biases, and activation functions until the output layer 343 produces the network's output 150.

The output generated by the output layer 343 is compared to the expected output (e.g., a "ground-truth" such as the corresponding correct answer for an input question) from the training data, to compute a loss function that measures the discrepancy between the predicted output and the expected output. For example, the loss function may be cross entropy, MMSE, any other suitable loss functions, or a combination thereof. Given the loss, the negative gradient of the loss function is computed with respect to each weight of each layer individually. Such negative gradient is computed one layer at a time, iteratively backward from the last layer 343 to the input layer 341 of the neural network. These gradients quantify the sensitivity of the network's output to changes in the parameters. The chain rule of calculus is applied to efficiently calculate these gradients by propagating the gradients backward from the output layer 343 to the input layer 341.

Parameters of the neural network are updated backwardly from the last layer to the input layer (backpropagating) based on the computed negative gradient using an optimization algorithm to minimize the loss. The backpropagation from the last layer 343 to the input layer 341 may be conducted for a number of training samples in a number of iterative training epochs. In this way, parameters of the neural network may be gradually updated in a direction to result in a lesser or minimized loss, indicating the neural network has been trained to generate a predicted output value closer to the target/desired output value with improved prediction accuracy. Training may continue until a stopping criterion is met, such as reaching a maximum number of epochs or achieving satisfactory performance on the validation data. At this point, the trained network can be used to make predictions on new, unseen data, such as performing question answering tasks.

Therefore, the training process transforms the neural network into an "updated" trained neural network with updated parameters such as weights, activation functions, and biases. The trained neural network thus improves neural network technology in question answering systems.

Figure 4:
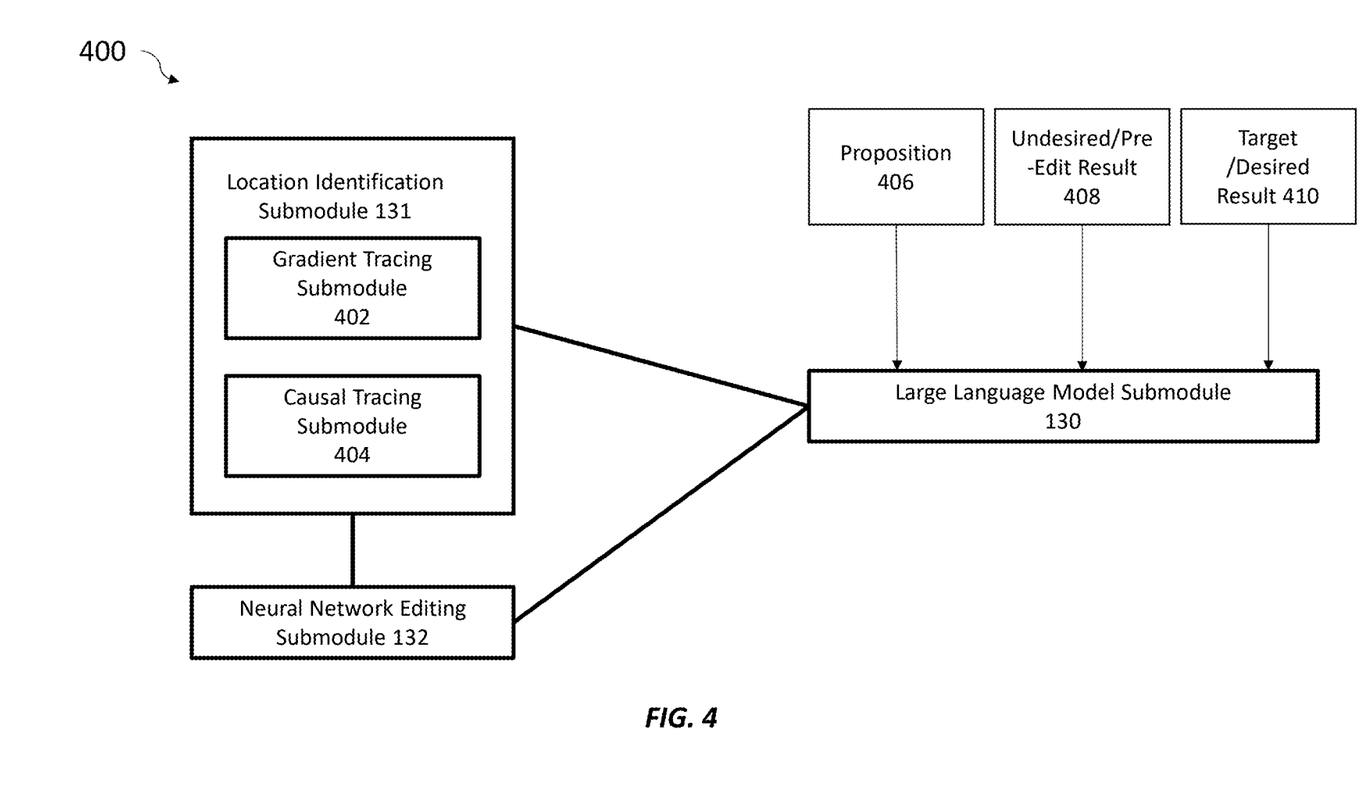
FIG. 4 is a simplified block diagram illustrating the language model editing framework, according to one embodiment described herein.

Referring to FIG. 4, a simplified block diagram illustrates an example language model editing framework 400 for language model editing, according to one embodiment described herein. As shown in FIG. 4, the framework 400 includes a large language model submodule 131, a location identification submodule 402 for identifying the editing location, and a neural network editing submodule 133 for editing the large language model at the identified editing location. The location identification submodule 131 may use the grace tracing submodule 402, alone or in combination with other submodules (e.g., casual tracing submodule), to provide the editing location.

As shown in FIG. 4, the large language model 130 receives a proposition 406, the undesired result 408, and the target/desired result 410.

The location identification submodule 402 includes a edit location identification submodule 132, which performs the Gradient Tracing (GT) method to localize factual information in LLM. In an example, a loss function is provided as follows:

$$1 - P(\text{desired output} \mid \text{pre-edit}) + P(\text{undesired output} \mid \text{pre-edit}), \quad (1)$$

where P(T|pre-edit) is the probability that the large language model, prior to editing, outputs token T given the prompt. P(T|post-edit) is the probability that the large language model, post editing, outputs token T given the prompt.

Using the gradient tracing submodule 131, the gradients of the large language model 130 (e.g., a transformer neural network 130) w.r.t. the loss function are computed. As described in detail below with regard to neural network editing submodule 132, edits are made based on these gradients, e.g., based on an editing location where the gradient norm of the MLP component is maximized over some subset of the network.

In various embodiments, Gradient Tracing takes in multiple sets as hyper-parameters, including for example: subset $\mathbb{T}$ of tokens considered (e.g., tokens in a vocabulary of the large language model), subset $\mathbb{L}_{grad}$ of layers from which the maximum gradient is chosen, and subset $\mathbb{L}_{ed}$ of layers from which the editing layer is chosen. For example, if $\mathbb{T}$ includes all tokens, and $\mathbb{L}_{grad} = \mathbb{L}_{ed}$ include all layers, then the edit location is determined based on where the gradient norm is maximized over the whole network.

In some embodiments, Gradient Tracing allows for limiting these sets of hyper-parameters. In one example, the best editing performance may be achieved (e.g., on CounterFactFalse (CFF), CounterFactTrue (CFT)) by setting $\mathbb{T}$ to include all tokens except the wrapping tokens used for T/F formatting and the last non-formatting token, $\mathbb{L}_{grad} = \{0\}$ to include just the first layer, and $\mathbb{L}_{grad} = \{2\}$ to include just the third layer. In that case, the layer to edit is layer 2, but the token to edit would be the one from $\mathbb{T}$ which maximizes the gradient norm in layer 0. Note that since the T/F wrapping tokens are added by Gradient Tracing itself and in the same way for all prompts, they are pre-labeled and hence can be ignored.

In some embodiments, the best editing performance (e.g., for a particular dataset) is achieved by having $\mathbb{T}$ be the set of all non-formatting tokens (including the last), $\mathbb{L}_{grad} = \{0\}$ and $\mathbb{L}_{ed} = \{3\}$. It should be noted that in some embodiments, the gradient norm in some language model (e.g., Vicuna-7b) for the datasets is close to monotonically decreasing with the layers, so setting $\mathbb{L}_{grad}$ to include all layers ends up being very similar to $\mathbb{L}_{grad} = \{0\}$. While slightly better results may be achieved with the latter option, the difference is minor. The computation of Gradient Tracing is extremely fast and simple, as it only requires a single iteration of backpropagation.

Empirical results of the language model editing framework on some datasets (e.g., CFF and CFT) indicate that gradient tracing does very well in uncovering the tokens associated with the subject (e.g. "France" in "France is located in Europe"). This is particularly important since the experiments show that choosing the editing location to be a subject token rather than a non-subject token is crucial for editing success on those datasets.

The findings also indicate that editing is successful when gradient tracing selects any subject token location, not just the last subject token location (as suggested by previous work). As an example, where "France" is associated with three tokens "Fr," "an," "ce," editing is much more likely to be successful when gradient tracing selects any subject token location of those three tokens.

As shown in FIG. 4, the neural network editing submodule 132 performs an editing method to edit the language model 131 using the location data from the location identification submodule 402. The editing method may take a prompt in the format "True or false: <proposition>.\nAnswer:," and a desired post-edit truth value (e.g., True or False), and edits the language model 131 (e.g., Vicuna-7b), such that the post-edit language model 131 outputs that desired post-edit truth value. All tokens outside of <proposition> are referred to as the formatting tokens, and the last token of the proposition is referred to as the last token.

The editing method involves two steps:
  Using the location identification module to choose an editing location using GT alone, or a combination of GT with other location identification methods.
  Edit at that location (e.g., using ROME or other suitable editing method).

A specific example uses GT for editing location identification, and uses ROME for editing, and is referred to as ROME$^G$ below. In another example, when there is a clear semantic subject to the proposition, ROME is applied to edit at the last subject token (and some fixed layer), and that example is referred to as ROME$^S$.

In addition to the localization method (GT instead of last subject token), ROME$^G$ differs from ROME$^S$ in one additional aspect: ROME$^S$ uses subject labels not just for choosing the editing location, but also for an internal optimization operation meant to prevent a phenomenon called "essence drift". Since one of the goals of ROME$^G$ is to avoid the need for such labels, ROME$^G$ does not use subject labels for the internal optimization (e.g., by excluding the essence drift term in the internal optimization).

Figure 5:
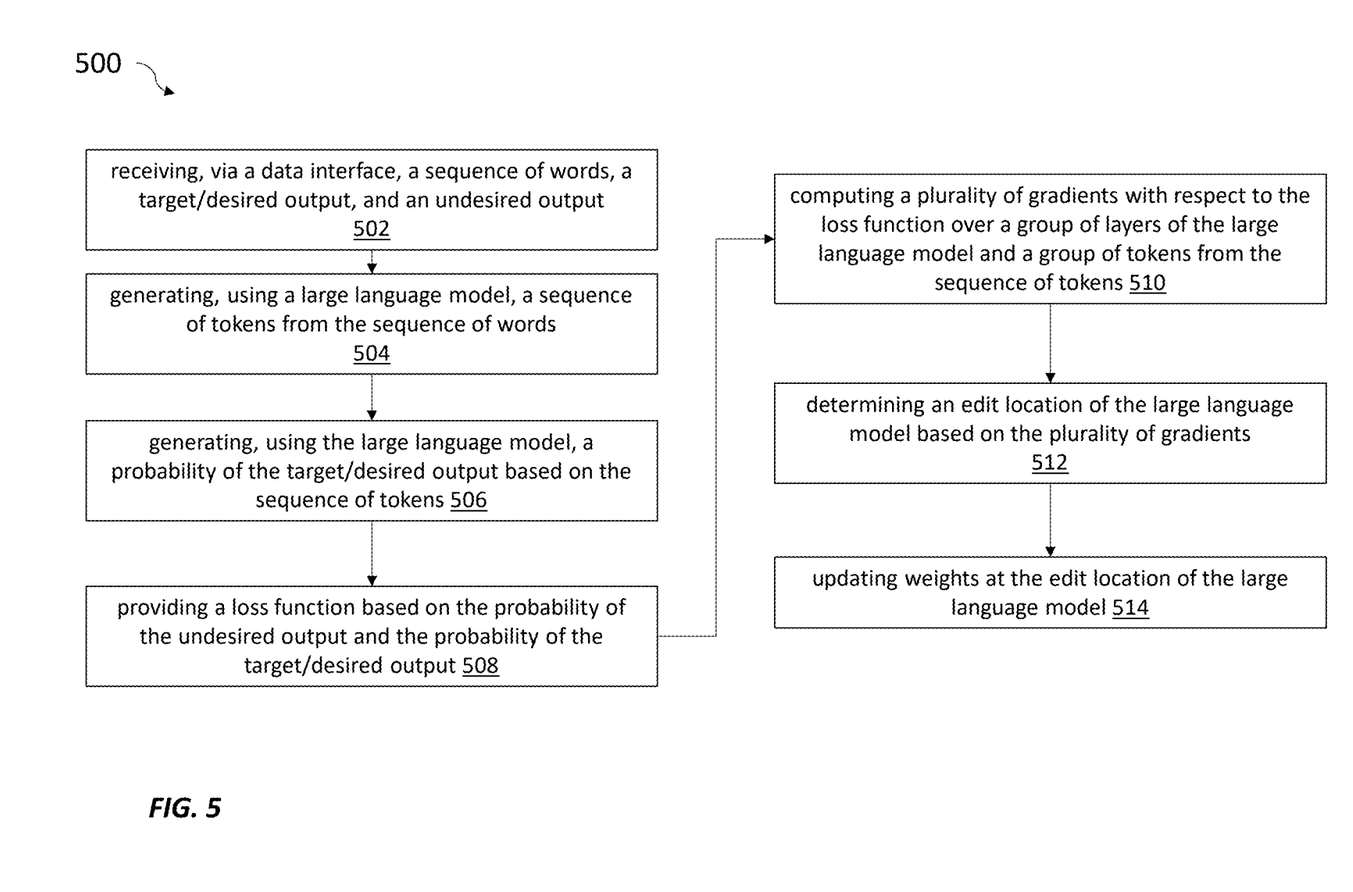
FIG. 5 is an example logic flow diagram illustrating a method for editing a large language model, according to some embodiments described herein.

Referring to FIG. 5, illustrated therein is a simplified block diagram illustrating an example method 500 for language model editing using a language model editing system. The method begins at block 502, where the language model editing system includes a large language model (referred to also as "pre-edit large language model"), and receives, via a data interface, a sequence of words ("e.g., "True or False: There has never been a female Italian Prime Minister," a target/desired output that is the desired truth value after edit (e.g., "False"), and an undesired output that is the truth value before edit (e.g., "True"). The undesired output is also referred to as a pre-edit output or a pre-edit output truth value.

The method 500 may proceed to block 504, where the pre-edit large language model receives the sequence of words as input and generates a sequence of tokens.

The method 500 may proceed to block 506, where the pre-edit large language model generates a first probability of the undesired/pre-edit output (e.g., "True") based on the sequence of tokens. At block 508, the pre-edit large language model generates a second probability (e.g., "False") of the target/desired output based on the sequence of tokens.

The method 500 may proceed to block 508, where a location identification model of the language model editing system provides a loss function based on the first probability of the undesired/pre-edit output and the second probability of the target/desired output. At block 510, the location identification module, e.g., using a gradient tracing model, to compute a plurality of gradients of the large language model with respect to the loss function over a group of layers of the large language model and a group of tokens from the sequence of tokens associated with the sequence of words generated at block 504. At block 512, the location identification module determines a location (also referred to as an edit location) based on the plurality of gradients, where the location includes a layer location (also referred to an edit layer location), a token location (an edit token location), or a combination of both.

The location identification module, e.g., using a gradient tracing model, determine the location within the large language model with the largest gradient (among the considered groups of layers and/or tokens) in the plurality of gradients.

The method 500 may proceed to block 514, where the location identification module may provide the edit location (e.g., including edit layer location and edit token location) to a neural network editing model of the language model editing system. The neural network editing model edits the weights at the edit location of the large language module, such that the updated large language model generates the target/desired output ("false") in response to an input including the sequence of words.

Example Data Experiments and Performance

Figure 6:
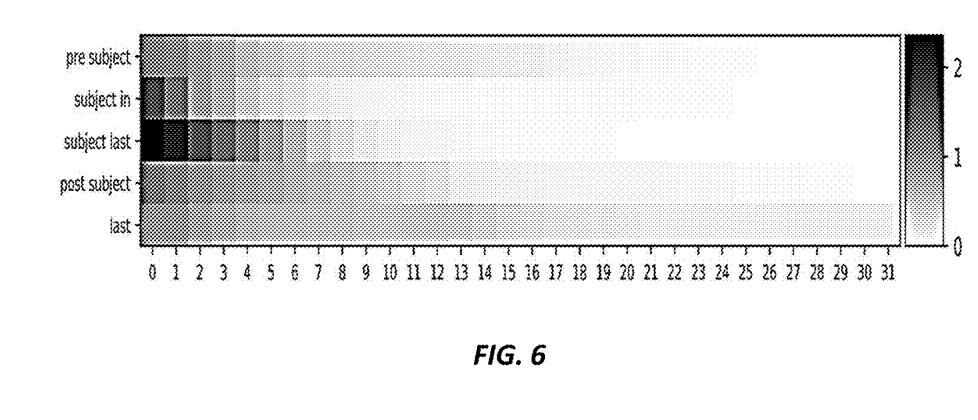
FIGS. 6-8 provide example experimental results illustrating example data performance of the language model editing model described in relation to FIGS. 1-5, according to some embodiments described herein.
Figure 7:
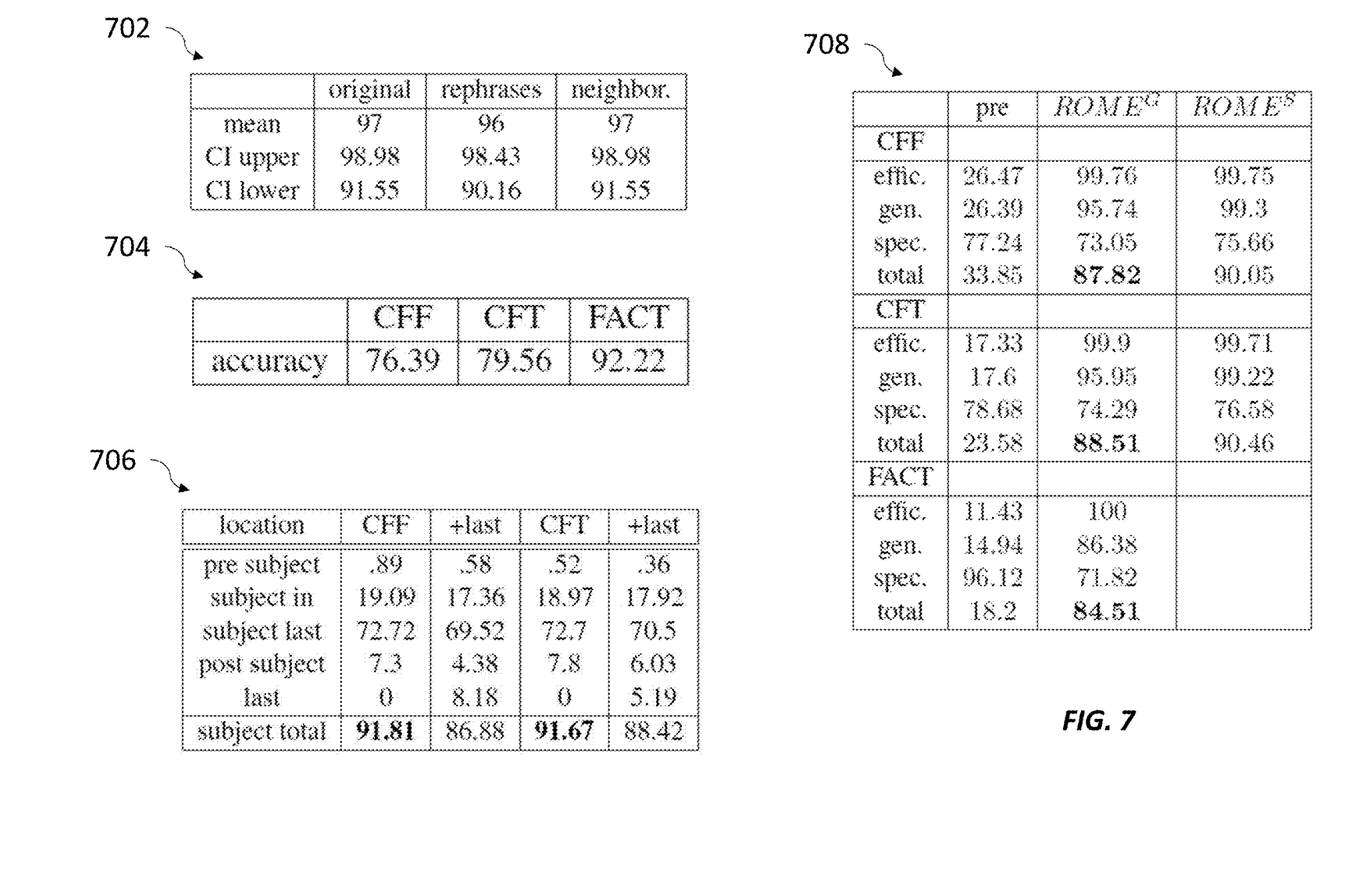
Figure 8:
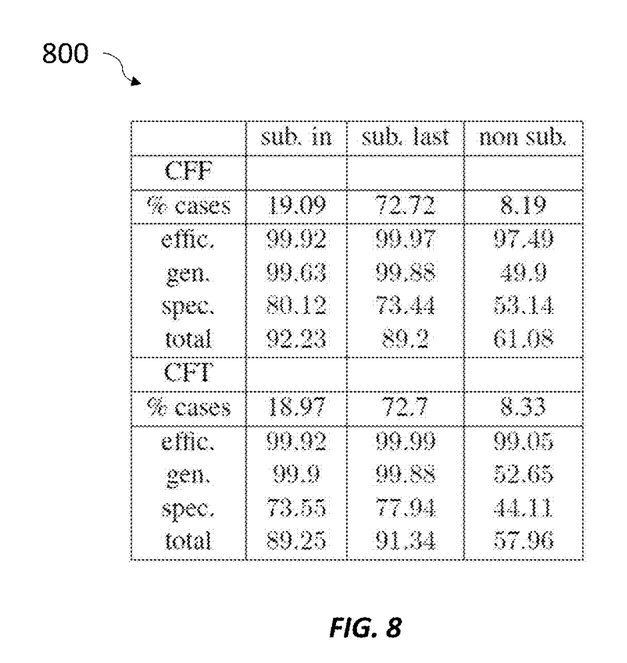

Referring to FIGS. 6, 7, and 8, example data experiments and performance of the language model editing are described.

Referring to FIG. 6, the gradient norm of the MLP components throughout a language (e.g., Vicuna-7b) is visualized, averaged over all original statements in CFF (the results are similar for CFT). It is worth mentioning that CFF and CFT propositions open with the subject in 77.29% of the cases, so the pre-subject bucket is empty the majority of the time. Furthermore, in this example, the subject never appears last in the prompt, so there is no overlap between the subject, and the last token.[1] As can be seen from the visualization, the gradient norm tends to be particularly large at the last subject token, followed by the other subject tokens (significantly behind). It can also be seen that gradient norms are generally much larger in earlier layers, and in fact close to monotonically decreasing with the layers.

[1] In CF, the subject also never appears last in the prompt, and it appears first in 80.18% of the cases.

Datasets.

The experiments use various datasets including CFF, CFT, and Factual Accuracy Classification Test (FACT). CFF and CFT are Boolean classification datasets derived from CounterFact (CF).

CFF and CFT are derived from CT as follows. CF consists of 21919 entries, which contain binary propositions with the subject labeled. Propositions are given in a "fill in the blank" format: partial sentences containing a subject and relation are provided, and the response is expected to be an object. Each entry contains two objects (e.g. Europe and Asia), and an original partial statement (e.g. France is located in), for which appending the first object represents a true proposition and appending the second represents a false proposition. In addition, each entry contains two rephrases of the original partial statement (e.g. France belongs to the continent of), and a collection of neighborhood partial statements using the same relation but not the same subject (e.g. Germany is located in the continent of), again made true by appending the first object and false by appending the second.

In the original benchmark, the model is edited with the intention that it completes the original partial statement with the second object (e.g. Asia) instead of the first (e.g. Europe). The edit's efficacy score is 1 if P(second object|post-edit)>P(first object|post-edit) and 0 otherwise; its generalization score (between 0 and 1) is the mean percentage of rephrase prompts for which the same inequality holds; and its specificity score is the mean percentage of neighborhood prompts for which the reverse inequality P(second object|post-edit)<P(first object|post-edit) holds. The scores for the editing method in each category are computed as a mean over all CF entries, and the total score is the harmonic mean of the three.

Various embodiments of the language model editing framework as discussed herein aim to enable the editing of arbitrary propositions. For example, "fill in the blank" may not be relevant, but T/F questions are always applicable. Therefore, Boolean classification variants of CF, namely CFF and CFT, are created for the language model editing framework. After a certain curation and modification of CF described below, CFT completes all statements in CF with the first object (e.g., Europe in the example above), making them true, and CFF completes them with the second object (e.g. Asia), making them false. The test for CFT involves prompting its statements as T/F questions (e.g. True or false: France is located in Europe.\nAnswer:), and editing the answer for the original statement to be False. Similar to the original CF benchmark, the edit's efficacy score is 1 if P (False|post-edit)>P (True|post-edit) and 0 otherwise; its generalization score is the mean number of rephrase sentences for which the same inequality holds; and its specificity score is the mean number of neighborhood statements for which P(False|post-edit)<P (True|post-edit). The scores for CFF are similarly defined, with the roles of True and False reversed. Similar to CF, the scores for the dataset are computed as a mean over all entries in the dataset, with the total score being the harmonic mean.

Because CF was designed for "fill in the blank", many of its phrasings are not designed as propositions, even though the information they represent is propositional. For example, the relation Brad Pitt-native speaker-English can be expressed in CF as "Brad Pitt, a native English" (as in, the prompt provided is "Brad Pitt, a native," which is expected to be completed with "English"). As another example, the relation Carlos Santana-plays instrument-guitar can be expressed as "Carlos Santana, performing on the guitar" or even just "Carlos Santana, the guitar" (where the prompts provided are "Carlos Santana, performing on the" and "Carlos Santana, the," expected to be completed with "guitar"). Therefore, before creating CFF and CFT, a transitory dataset is created from CF by curating and modifying a subset of 12659 entries in CF, so that the phrasings are designed as propositions, and then CFF and CFT are created by appending the objects to the transitory dataset.

Next the FACT dataset is described. CFF and CFT allow the comparison of the performance of $ROME^G$ with $ROME^S$, because they are limited to binary propositions. Furthermore, despite the manual curation, CFF and CFT still contain some unusual/vague phrasings, which limit the classification accuracy of the language model (e.g., Vicuna-7b). To provide a more general and representative test for Boolean classification, the FACT dataset is created. FACT consists of 1024 entries. Like CFF and CFT, each entry in FACT contains an original proposition and two rephrases of the proposition. Unlike CFF and CFT, the neighborhood statements consist of two statements about each main term in the original statement; the neighborhood statements are true if the original statement is true and false otherwise (for comparison, in CF the neighborhood statements always use the same relation and object as the original statement). Further, unlike CFF and CFT, the propositions are not limited to straightforward binary relations, and the sentences used are phrased more precisely as propositions. Here are a few statements from a couple of entries in FACT:

Statement for editing: Sparta was a democratic city-state in ancient Greece. Truth value: False (desired truth value after edit: True).
Rephrase example: The city-state of Sparta in ancient Greece was governed by democratic principles.
Neighborhood statements examples (all false): Sparta is a modern-day city in France. All city-states in ancient Greece were democratic.
Statement for editing: Queen Victoria reigned over England during the Victorian era. Truth value: True (desired truth value after edit: False).
Rephrase example: During the Victorian era, Queen Victoria was the monarch of England.
Neighborhood statements examples (all true): Queen Victoria was a British monarch, England is a country in the United Kingdom, The Victorian era was a period of time in British history.

The testing on FACT is identical to the testing on CFF and CFT. For testing to be informative, it is important for the model to classify as many propositions as possible correctly pre-edit. It is noted that for Vicuna-7b, this measure is better on FACT than on CFF and CFT. FACT also contains related propositions with the opposite truth value to the original proposition, as well as negations for every proposition in the dataset.

FACT is generated by repeatedly prompting ChatGPT. Since ChatGPT can make factual errors, the accuracy of FACT is tested by manually checking the correctness of a random sample of propositions from it. 100 propositions are randomly sampled from the original statements (the ones to be edited), 100 propositions from the rephrases and 100 propositions from the neighborhood statements. The vast majority of the statements are accurate. The results are shown in Table 702 of FIG. 7 illustrating the FACT accuracy percentages. Each sampled statement was manually evaluated. Each of the three columns has sample size 100; the upper and lower bounds for the confidence intervals (CI) are Wilson with p=0.05.

Example editing results are given in Table 708 of FIG. 7. The results provided correspond to the best hyperparameter choices found during the experiments: given that the gradient norms are much larger in earlier layers, it is not surprising that early layers for tracing and editing yielded the best results. In table 708, the first column contains the scores of Vicuna-7b pre-edit. $ROME^G$ has been applied to CFF and CFT with T including all non-formatting tokens except the last, $L_{grad}=\{0\}$ and $L_{ed}=\{2\}$, while for FACT, T is set to include all non-formatting tokens (including the last), $L_{grad}=\{0\}$ and $L_{ed}=\{3\}$. $ROME^S$ has been applied to CFF and CFT on Layer 2.

On CFF and CFT, $ROME^G$ achieves close performance to $ROME^S$, without using any subject labels. Nevertheless, since these datasets do come with pre-labeled subjects, the labels are used after the fact to analyze $ROME^G$ more in depth. Table 800 of FIG. 8 clarifies what happens underneath the hood. When GT lands on a subject token, $ROME^G$ performance approximately matches (and sometimes surpasses) the average performance of $ROME^S$ on the dataset. However, when GT lands outside of the subject, $ROME^G$ performs poorly. While the case of the last subject token is not surprising ($ROME^G$ differs from $ROME^S$ only in the lack of essence drift protection there), the good performance of $ROME^G$ on non-last subject tokens is surprising, as causal tracing indicated no important role for such tokens. On FACT, which presents a more challenging task than CFF and CFT, $ROME^G$ performs much better than random. As shown, the language editing method here can edit arbitrary propositions.

Unlike smaller models, Vicuna-7b functions reasonably well as a Boolean classifier (see Table 704 of FIG. 7). For the editing experimentation to be informative, the LLM is required to classify significantly better than random pre-edit. On CFF, CFT and FACT, Vicuna-7b classifies 76.39%, 79.56% and 92.22% of the propositions correctly, in the sense that the correct response token (True or False) has output probability larger than the incorrect response token.

As shown by the experiment results, the language model editing framework uses Gradient Tracing, which is a simple and fast method to localize factual information in LLMs. Gradient Tracing attributes factual information to neural network components with large gradient norm, and requires only a single iteration of backpropagation. Using Gradient Tracing, an LLM is edited using an editing method (e.g., ROME) without using any subject labels. The language model editing framework as described performs closely to the state-of-the-art in L&E methods (which use subject labels), but without using subject labels. Furthermore, the language model editing framework described herein is applicable to datasets where other available L&E methods are not applicable, due to lack of subject labels or due to the existence of non-binary propositions. A new dataset, Factual Accuracy Classification Test (FACT), is generated for testing the language model editing framework. As shown in the experiment results, the language model editing method as described is capable of handling unlabeled non-binary propositions.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of editing a large language model, the method comprising:
    receiving, via a data interface, a sequence of words, a target output, and a pre-edit output;
    generating, using the large language model, a sequence of tokens of the sequence of words;
    generating, using the large language model, a first probability of the pre-edit output based on the sequence of tokens;
    generating, using the large language model, a second probability of the target output based on the sequence of tokens;
    providing a loss function based on the first probability of the pre-edit output and the second probability of the target output;
    computing a plurality of gradients of the large language model with respect to the loss function;
    determining an edit location of the large language model based on the plurality of gradients; and
    editing the large language model by editing weights at the edit location of the large language model, such that the updated large language model generates the target output for an input including the sequence of words.

2. The method of claim 1, wherein the sequence of words is associated with a non-binary proposition.

3. The method of claim 1, wherein the sequence of words is associated with a Boolean classification prompt, and
    wherein the edit location includes an edit token location associated with a subject of the Boolean classification prompt.

4. The method of claim 3, wherein the subject is associated with a plurality of tokens including a last token, and
    wherein the edit token location is associated with a token of the plurality of tokens before the last token.

5. The method of claim 1, wherein the computing the plurality of gradients of the large language model with respect to the loss function includes:
    computing the plurality of gradients of the large language model with respect to the loss function over a group of tokens from the sequence of tokens and a first group of layers of the large language model.

6. The method of claim 5, wherein the determining the edit location of the large language model based on the plurality of gradients includes:
    determining an edit layer location by selecting from a second group of layers of the large language model based on the plurality of gradients associated with the second group of layers.

7. The method of claim 1, wherein the editing the large language includes:
    editing the weights at the edit location without using a subject label.

8. A system for language model editing, the system comprising:
    a memory that stores a large language model and a plurality of processor-executable instructions;
    a communication interface that receives a sequence of words, a target output, and a pre-edit output;
    one or more hardware processors that read and execute the plurality of processor-executable instructions from the memory to perform operations comprising:
        generating, using the large language model, a sequence of tokens of the sequence of words;
        generating, using the large language model, a first probability of the pre-edit output based on the sequence of tokens;
        generating, using the large language model, a second probability of the target output based on the sequence of tokens;
        providing a loss function based on the first probability of the pre-edit output and the second probability of the target output;
        computing a plurality of gradients of the large language model with respect to the loss function;
        determining an edit location of the large language model based on the plurality of gradients; and
        editing the large language model by editing weights at the edit location of the large language model, such that the updated large language model generates the target output for an input including the sequence of words.

9. The system of claim 8, wherein the sequence of words is associated with a non-binary proposition.

10. The system of claim 8, wherein the sequence of words is associated with a Boolean classification prompt, and wherein the edit location includes an edit token location associated with a subject of the Boolean classification prompt.

11. The system of claim 10, wherein the subject is associated with a plurality of tokens including a last token, and wherein the edit token location is associated with a token of the plurality of tokens before the last token.

12. The system of claim 10, wherein the computing the plurality of gradients of the large language model with respect to the loss function includes:

computing the plurality of gradients of the large language model with respect to the loss function over a group of tokens from the sequence of tokens and a first group of layers of the large language model.

13. The system of claim 12, wherein the determining the edit location of the large language model based on the plurality of gradients includes:

determining an edit layer location by selecting from a second group of layers of the large language model based on the plurality of gradients associated with the second group of layers.

14. The system of claim 8, wherein the editing the weights at the edit location of the large language includes:

editing the weights at the edit location without using a subject label.

15. A non-transitory machine-readable medium comprising a plurality of machine-executable instructions which, when executed by one or more processors, are adapted to cause the one or more processors to perform operations comprising:

receiving, via a data interface, a sequence of words, a target output, and a pre-edit output;

generating, using the large language model, a sequence of tokens of the sequence of words;

generating, using the large language model, a first probability of the pre-edit output based on the sequence of tokens;

generating, using the large language model, a second probability of the target output based on the sequence of tokens;

providing a loss function based on the first probability of the pre-edit output and the second probability of the target output;

computing a plurality of gradients of the large language model with respect to the loss function;

determining an edit location of the large language model based on the plurality of gradients; and editing the large language model by editing weights at the edit location of the large language model, such that the updated large language model generates the target output for an input including the sequence of words.

16. The non-transitory machine-readable medium of claim 15, wherein the sequence of words is associated with a non-binary proposition.

17. The non-transitory machine-readable medium of claim 15, wherein the sequence of words is associated with a Boolean classification prompt, and wherein the edit location includes an edit token location associated with a subject of the Boolean classification prompt.

18. The non-transitory machine-readable medium of claim 17, wherein the subject is associated with a plurality of tokens including a last token, and wherein the edit token location is associated with a token of the plurality of tokens before the last token.

19. The non-transitory machine-readable medium of claim 15, wherein the computing the plurality of gradients of the large language model with respect to the loss function includes:

computing the plurality of gradients of the large language model with respect to the loss function over a group of tokens from the sequence of tokens and a first group of layers of the large language model.

20. The non-transitory machine-readable medium of claim 19, wherein the determining the edit location of the large language model based on the plurality of gradients includes:

determining an edit layer location by selecting from a second group of layers of the large language model, wherein the edit layer location corresponds to a layer with the largest gradient in the plurality of gradients associated with the second group of layers.

* * * * *